9324X
S. WITHEROW.
Plow-Cleaner.
Patented Jan. 15, 1836.
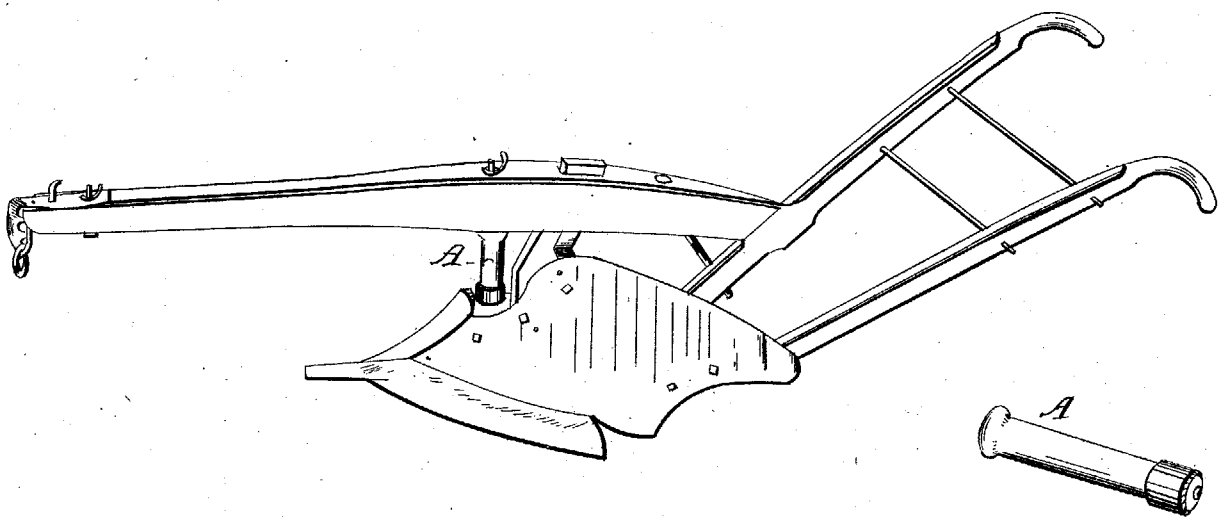
N. PETERS, PHOTO-LITHOGRAPHER, WASHINGTON, D. C.

Samuel Witherow

The Schedule referred to in these Letters patent and making part of the same containing a description in the words of the said Samuel Withrow himself of his improvement in the Plough To all to whom these presents shall come: Be it Known that I Samuel Withrow of Gettysburg in the County of Adams and State of Pennsylvania have invented a new and useful improvement in the Plough the improvement consists in placing a Roller under the beam near the centre of the Plough in or near a perpendicular position. the Roller may be made plain, ridged, grooved or otherwise, the use of the Roller is to prevent the plough from choaking by rolling of the vegetable matter that usually collects under the beam Witnesses
Jno. Garvin
R. Smith Samuel Withrow Drawings

[illegible] 1156

192 [illegible]